Oct. 3, 1939.   R. L. DAVISON   2,175,148
COMBINED ELECTRIC WIRING AND MOLDING SYSTEM
Filed Aug. 4, 1937   3 Sheets-Sheet 1
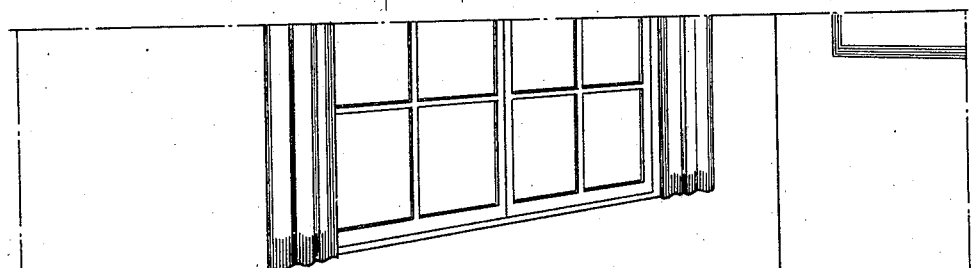
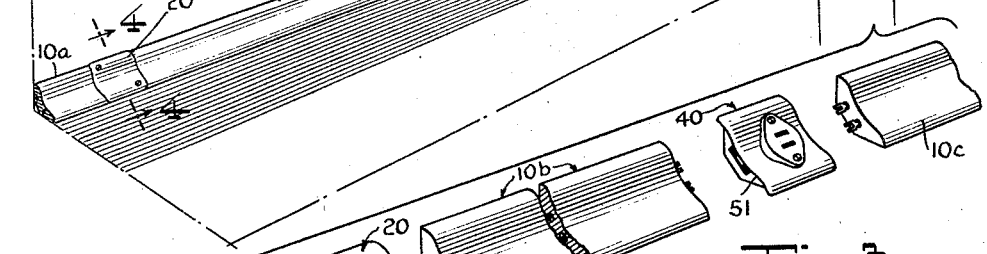
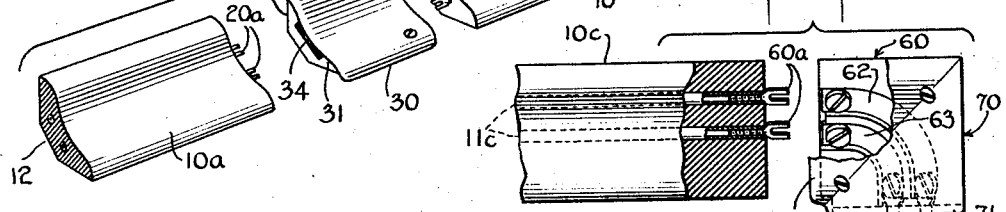
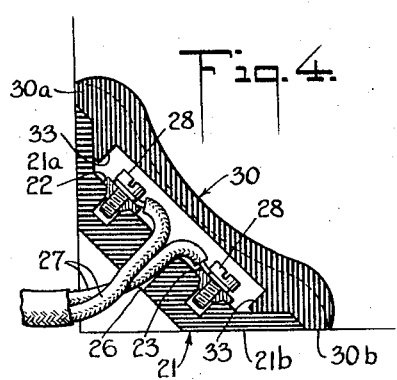
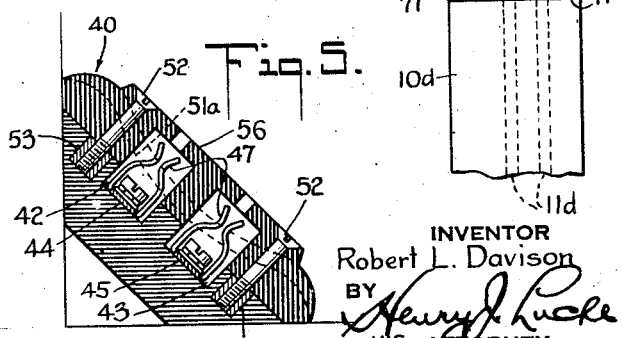
INVENTOR
Robert L. Davison
BY
HIS ATTORNEY Oct. 3, 1939.                R. L. DAVISON                    2,175,148
              COMBINED ELECTRIC WIRING AND MOLDING SYSTEM
                  Filed Aug. 4, 1937        3 Sheets-Sheet 2
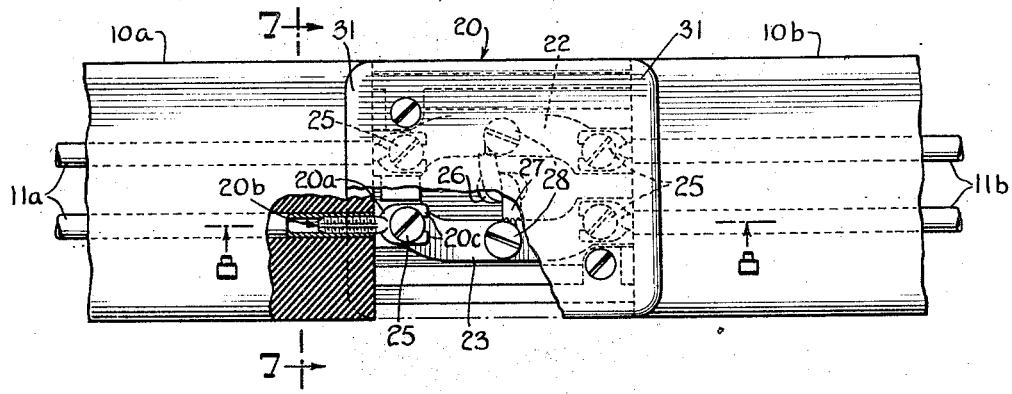
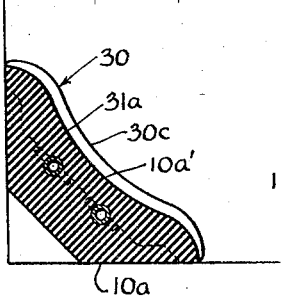
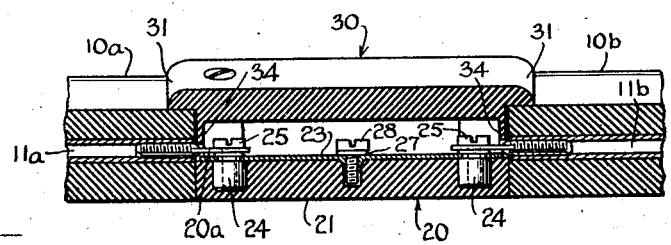
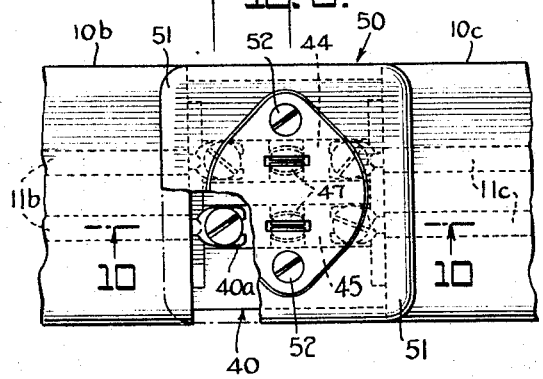
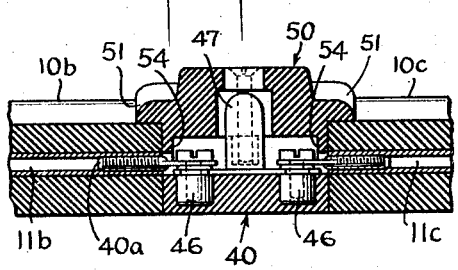
INVENTOR
Robert L. Davison
BY
HIS ATTORNEY Oct. 3, 1939.  R. L. DAVISON  2,175,148
COMBINED ELECTRIC WIRING AND MOLDING SYSTEM
Filed Aug. 4, 1937  3 Sheets-Sheet 3
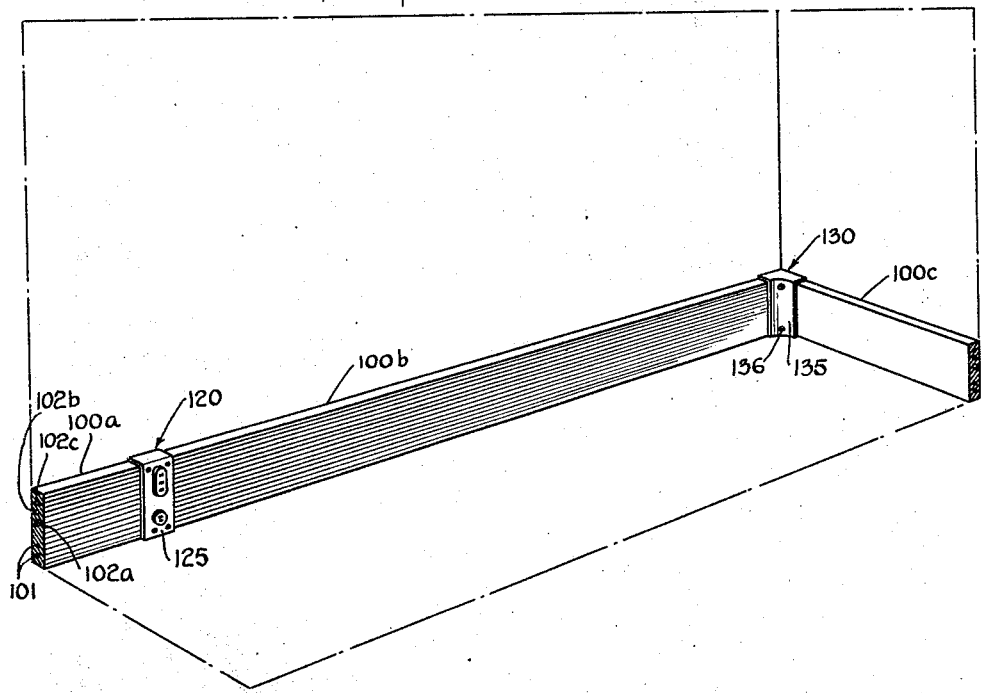
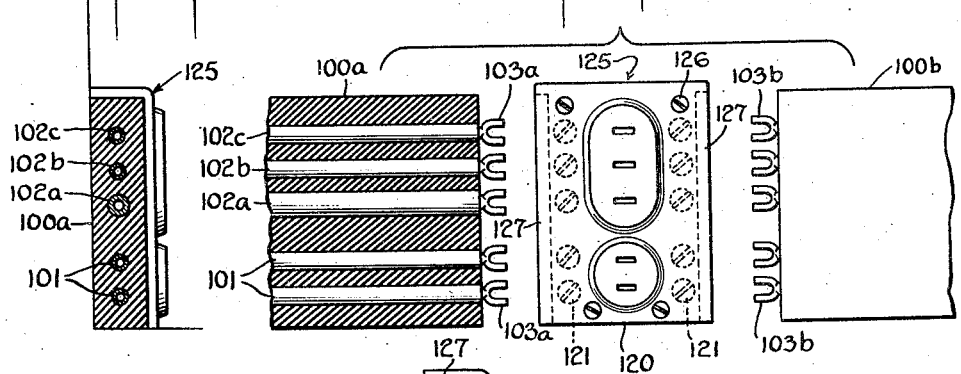
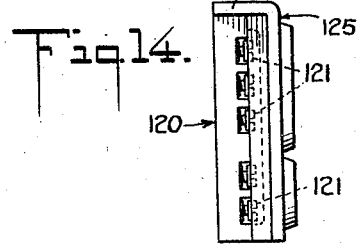
INVENTOR
Robert L. Davison
BY
HIS ATTORNEY Patented Oct. 3, 1939

2,175,148

UNITED STATES PATENT OFFICE 2,175,148

COMBINED ELECTRIC WIRING AND MOLDING SYSTEM

Robert L. Davison, New York, N. Y., assignor to John B. Pierce Foundation, New York, N. Y., a corporation of New York Application August 4, 1937, Serial No. 157,271

5 Claims. (Cl. 173—334.1)

This invention relates to improvements in interconnecting units for use with combined molding and electrical wiring systems.

In my co-pending application Serial No. 690,653, filed September 23rd, 1933, entitled Combined electric wiring and molding system, I have set forth exemplifications of molding and electric wiring systems comprising substantially long and short units of insulating material, simulating molding in form and appearance, the long units of which carry spaced apart, preferably tubular, electric conductors. My co-pending applications Serial No. 725,063, filed May 11th, 1934, entitled Interconnecting unit construction for combined molding and electric wiring system and No. 725,064, filed May 11th, 1934, entitled Outlet provided interconnecting unit disclose improved forms of short or interconnecting units and electric outlet means for use with the wiring system disclosed in the first-mentioned co-pending application.

Conductor units, furnished preferably in uniform lengths, are arranged to be connected, electrically and mechanically, by interposed interconnecting units and/or electric outlet-provided units, the electric and mechanical joint between the said conductor units and the interconnecting units being made in the manner described in the aforestated applications Serial Nos. 725,063 and 725,064, namely by means of screw-threaded, fluted connectors of relatively hard, electrically conducting material, such as copper or phosphor bronze, arranged to be screwed into tubular conductors provided in the conductor units.

An object of this invention is to provide means for shielding or covering the serially interconnected units at the junctions thereof. The covering means serve to shed water or other electrically conducting fluids and thus prevent ingress to the conductors and minimize short circuiting from this cause; to prevent the exposure of conductors at the joints resulting from the development of gaps because of the settling of the building or other causes; and to deter the malicious or unauthorized tampering with the conductors, as by children, by precluding access to, or exposure of, the conductors without first removing the covering means.

In this invention, the interconnecting units are formed with a base or body portion, comprised of electrical insulation material, pursuant to my aforesaid co-pending application Serial No. 690,653, and a removable, electrically insulating cap or cover, having wings or eave-like extensions arranged to overlap, and closely follow the contour of, the outer surface of the associated conductor units. After completing the electrical connection in the manner referred to, the joint between successive units is made substantially tamper proof and dust and moisture tight by means of the cap, which covers and shields the joints and conceals the conductors.

The interconnecting units may either be of the combined connecting unit and outlet type disclosed in the aforestated application Serial No. 725,064 or of the individualized connecting unit or outlet unit set forth in my application Serial No. 725,063.

The combined molding and electric wiring system advantageously makes each room a separately fed unit of the general building electric wiring system. Preferably, therefore, there is used in the system at least one connector unit which, in addition to completing the electric room circuit, also serves as the junction with the main distribution system. In such interconnecting unit it is desirable to employ one or more lengths or bars of fusible connecting material, thus replacing ordinary electric fuses or similar devices and giving each room localized overload protection.

The combined molding and electric wiring system is not limited to paired conductors in molding or trim. For example, in rooms or portions of the building containing electrical devices such as stoves or heaters which have a current requirement in excess of the usual domestic electric equipment, or special circuits, it may be desirable to employ this invention in the form of a baseboard or similar trim sufficiently large to accommodate, in adequately insulated, spaced relationship, several conductors, one or more of which may be of a capacity necessary to meet the specialized requirement. With such a baseboard or plural-conductor-carrying molding or trim it will be understood that an adaptation of the electric outlet means or interconnecting means can be employed, and that any particular conductor may be provided with fusible protection.

In the accompanying drawings:

Figure 1 is a perspective of a portion of a room in which conduit-containing molding is used, and in which there is shown an electric outlet-provided interconnecting unit, a power feed interconnecting unit and a converging face interconnecting unit, the latter being utilized for forming a corner angle;

Figure 2 is an exploded, foreshortened, perspective of a portion of the molding of Figure 1;

Figure 3 is a view, partly in horizontal section, of the corner portion of the view of Figure 1, showing the screw-threaded connecting devices and their associated conductors;

Figure 4 is a sectional elevation of an interconnecting unit, taken on 4—4 of Figure 1, showing means for connecting to a main power source;

Figure 5 is an elevation showing the section of the outlet-provided interconnecting unit of Figure 1;

Figure 6 is a view, partly in horizontal section, showing the interconnecting unit of Figure 1 and illustrating a form of the fusible link construction;

Figure 7 is a section through 7—7 of Figure 6 showing the contour of the conductor unit and of the cover for the cooperating interconnecting unit of Figure 6;

Figure 8 is a section taken through 8—8 of Figure 6 illustrating the overhang of the cap portion of the interconnecting unit with respect to the abutting conductor units;

Figure 9 is a view, partly in section, of the outlet-provided interconnecting unit of Figure 1;

Figure 10 is a section taken on 10—10 of Figure 9 illustrating in a manner similar to that of Figure 8 the protection afforded by the extended cap of the outlet-provided unit of Figures 9 and 1;

Figure 11 is a perspective of a portion of a room employing this invention in the form of a baseboard having multiple electrical connectors insulatedly contained therein, one of said conductors being suitable for high amperage;

Figure 12 is a vertical section of the baseboard portion of the wiring system of Figure 11;

Figure 13 is an exploded elevation, partly in vertical section, showing an outlet-provided unit interconnecting with the conductor units, the latter having connectors inserted into the tubular conductors thereof preparatory to assembling the conductor and interconnecting units; and Figure 14 is an elevation of the outlet-provided connecting unit of Figures 11 and 13.

Referring to Figs. 1 and 2, 10a, 10b, 10c, 10d designate electrical conductor units, the body portion of each being preferably constituted, as set forth in my co-pending application, Serial No. 690,653, entirely of electrical insulating material substantially wholly surrounding its embedded tubular conductors, as 11a, 11b, etc., and extending substantially continuously from conductor to conductor. The respective conductor units may be connected, in seriatim, by interconnecting units 20, 40, 60, the numbers respectively designating a straight interconnecting unit, an outlet-provided interconnecting unit, and a corner unit of converging facial relationship, each of said units being used as later described.

Referring to Fig. 2, the interconnecting unit 20 is shown as having a base portion 21 of electrical insulation material, the contour of which base portion conforms to that of the rear surface 12 of the long units. The base 21 is provided with substantially longitudinal, spaced apart conductors 22, 23, see Figs. 4 and 6, arranged to have their terminal ends in registry with the tubular conductors of long units. Preferably, internally screwthreaded anchor posts 24, Fig. 8, are provided, the said posts being molded in or otherwise affixed to the base portion 21, and arranged to receive machine screws 25.

As shown in Figs. 4 and 6, the base 21 may be provided with an aperture 26 arranged to receive the paired leads 27, which may serve to connect the room distribution unit with the main power source.

Electrical connection of the said leads with the conductors 22, 23 may be effected by clamping the leads thereto, as by screws 28, which engage a suitable tapping in the conductors, and preferably pass into accommodating recesses in the base 21.

It is to be noted here, that one of the conductors, as 23, may be permanently affixed, as by riveting, to its associated anchor posts 24, as shown in Fig. 8. It is a feature of this invention, however, that the other conductor, as 22, may be formed of fusible material, i. e., an electrically conducting alloy arranged to melt, and thus break the circuit, when subjected to a current overload. It is obvious, therefore, that this conductor must be readily replaceable, and as such, preferably not permanently secured to the anchor posts. The screws 25 may advantageously be used to secure the fusible link.

The angular interconnecting unit 60, Fig. 3, may be generally similar in construction to the unit 20, having conductors 62, 63 which may or may not have provision for connection with leads from the main power circuit. Fusible links may or may not be provided with the unit 60, it being generally desirable that in an electrical circuit accommodating one room or other enclosure, the number of fusible links be reduced to the minimum consonant with safety, to facilitate the location of a "blown" fuse.

The outlet-provided interconnecting unit 40, Fig. 9, is preferably formed with a base portion, see Fig. 5, of electrical insulation material, and shaped, as described with respect to the base 21, to cooperate with, or match, the contour of the bottom of the conductor units. Preferably, there are formed in the upper or outer face of the base, and parallel to but spaced apart from one another, longitudinally extending grooves 42, 43, in which are mounted conducting strips 44, 45, of suitable material. Posts 46, see Fig. 10, are utilized to secure the said strips to the base, and there may be formed, preferably integral with the strips and intermediate the ends thereof, upwardly extending resilient tongues 47, arranged to cooperate, in the usual manner, with the prongs of the conventional electrical appliance plug, not shown.

As indicated in Figs. 9 and 10 the termini of the strips 44, 45 are in cooperative alignment with the conductors 11 of the conductor units.

Advantageously, electrical and mechanical connection between the interconnecting units 20, 40, 60 and the tubular conductors of the conductor units is made by means of connectors 20a, 40a, 60a respectively, of comparatively hard, suitable electrical conducting material, such as phosphor bronze. Referring to connectors 20a, Fig. 6, as being typical of the construction, the substantially cylindrical body 20b of the connectors is preferably of greater diameter than the inside diameter of the conductors 11a, and is screw-threaded, whereby on screwing the connectors into the respective conductors, the screw-threading bites into the wall of the conductor making a good mechanical and electrical engagement. Preferably, the connectors 20a, etc., have flattened, forked heads, 20c, the bifurcation of the heads making the connectors readily cooperative with the screws 25 in effecting the mechanical and electrical connection between the connectors 20a, etc., and the conductors of the interconnecting units.

Each interconnecting unit is provided with an electrically insulating cap or cover, respectively designated by the reference numerals 30, 50, 70. Preferably, the caps are removably secured to their respective body-portions by screws, as illustrated at 52, Fig. 5, with reference to unit 40, the said screws engaging suitably tapped sleeves, as 53, Fig. 5, molded into, or otherwise fixed in, the base portion.

Referring to Fig. 7 as characteristic of the caps 30, 50, 70, and characteristic of any interconnecting or outlet unit made in accordance with this invention, it is shown that the caps are formed with an outer contour generally in conformity with the contour of the outer surface of the conductor units. In Fig. 7, 10a' indicates the surface of the unit 10a, and 30c the surface of the cap 30 of the interconnecting unit 20. Fig. 4 shows the conformity of the upper and lower edges 30a, 30b of the cap 30 to the top and bottom rear surfaces 21a, 21b of the base 21; and again referring to Fig. 7, the combination of the respective rear surfaces of the cap and base is indicated as being equal to the rear surfaces of the associated conductor unit.

It is a feature of all of the caps, compare Figs. 3, 6 and 9, that they are of greater extent, in longitudinal direction, than their respective base portions, and thus an overhang or eave 31, 51, 71, is formed at each end of the short units. The undersurface of the said eaves, as indicated at 31a, 51a, in Figs. 7 and 5, is preferably of a contour exactly matching the surface of the associated conductor units, so that a smooth, tight, overlap may be effected between the caps and the long units. The caps thus serve effectively to cover the abutting joints between conductor units and the interconnecting units, as shown in Figs. 3, 8, and 10; and as indicated in Figs. 1 and 2, the protection extends over the entire exposed surface of the conductor units, and reaches, in the floor-molding embodiment of the invention shown in Fig. 1, from the wall to the floor.

Additional details of construction of the caps may be observed in Fig. 4, in which tongues 33 serve to position the cap 30 within the base portion of the connector unit 20, and flanges 34, see Figs. 2 and 8, depend from the cap and serve as means for locating the cap longitudinally, and also, with the tongues 33, define a space within which the connectors 22, 23, and associated, previously described devices, are housed.

It will be understood that similar structural details may be used in caps 50, 70, and others, and that modifications in the cap design, to fulfill the specific requirements thereof, may be made. The cap of the outlet-provided connecting unit 40 may accordingly have a flat-surfaced, slotted outlet portion 56, see Fig. 5, and depending flanges 54, see Fig. 10.

In Fig. 11, there is illustrated a modification in which the conductor units 100a, 100b and 100c, also preferably entirely of moldable insulating material, simulate a baseboard or other structural unit having a volume within which can be housed a multiplicity of tubular connectors, some of which may be adaptable to specialized circuits. For example, paired conductors 101, see Fig. 13, may serve as an ordinary lighting circuit or as a circuit adapted for use in connection with telephone or radio installation. Conductors 102a, 102b, 102c may include an extra heavy unit, suitable for high amperage.

Adapted to interconnect the long units are the outlet-provided interconnecting unit 120 and the corner unit 130, these units to be used with suitable bifurcated connectors, as 103a and 103b to complete the electrical and mechanical engagement in the manner previously described. It will be understood that connectors associated with the heavy duty conductor 120a will be of suitable current carrying capacity.

Typical of the interconnecting units, as previously described, are a plurality of screws 121, see Figs. 13 and 14, for cooperation in making the electrical connection, and the removable caps 125, 135, see Figs. 11 and 14, removably secured to the interconnecting unit bases as by a suitable number of screws 126, 136.

In Fig. 13, which is typical of the type of interconnecting unit used in this modification, there are shown eaves 127 of the cap 125, the extent of which is indicated by the dotted line in Fig. 13, for shielding and concealing the joints between the serially interconnected units. As shown in Figs. 12 and 14, the cap extensions cover the top and front surfaces of the associated conductor units, to the end that adequate protection against tampering or the inflow of harmful fluids may be had. It will be understood that the rectangular cross section of the long units 100a etc. is merely one embodiment of this invention, and that the configuration of the cap of the interconnecting units is to be such that it will closely conform to the surface configuration of the conductor unit.

It will also be understood that the interconnecting units used in this modification may be provided with one or more fusible link conductors and with means whereby a set or all of the circuits can be connected to the main power sources.

Whereas I have described my invention by reference to specific forms thereof, it will be understood that many changes and modifications may be made without departing from the spirit of the invention.

I claim:
1. A conductor bearing interconnecting unit, serving as a mechanical and electrical connector unit relative to conductor units alternately connected in seriatim therewith, said interconnecting unit having a hollow base, electrical conductors spaced and electrically insulated from one another disposed within said hollow base, and a cover plate for closing said hollow base and enclosing said electrical conductors in said hollow base, said cover plate having an extension projecting beyond its lateral side in direction toward a conductor unit connected in seriatim with said interconnecting unit.

2. A conductor bearing interconnecting unit, serving as a mechanical and electrical connector unit relative to conductor units alternately connected in seriatim therewith, said interconnecting unit having a hollow base, electrical conductors spaced and electrically insulated from one another removably disposed within said hollow base, and a cover plate for closing said hollow base and enclosing said electrical conductors in said hollow base, said cover plate having extensions respectively projecting beyond its lateral sides in directions toward the respective conductor units connected in seriatim with said interconnecting units, the configuration of the under surface of said cover plate extensions matching the configuration of the upper surface of said conductor units.

3. A conductor bearing interconnecting unit, serving as a mechanical and electrical connector unit relative to conductor units alternately connected in seriatim therewith, said short unit having a hollow base composed substantially entirely of electrical insulation material, electrical conductors including a replaceable fuse element spaced and electrically insulated from one another disposed within said hollow base, and a cover plate for closing said hollow base and enclosing said electrical conductors in said hollow base, said cover plate having an extension projecting beyond its lateral side in direction toward a conductor unit connected in seriatim with said interconnecting unit.

4. A conductor bearing interconnecting unit, serving as a mechanical and electrical connector unit relative to conductor units alternately connected in seriatim therewith, said interconnecting unit having a hollow base, electrical conductors spaced and electrically insulated from one another disposed within said hollow base, and a cover plate substantially entirely of electrical insulation material for closing said hollow base and enclosing said electrical conductors in said hollow base, said cover plate having an extension projecting beyond its lateral side in direction toward a conductor unit connected in seriatim with said interconnecting unit, said cover plate including a plurality of depending walls arranged to position the cover plate with respect to said hollow base.

5. For combination with a conductor unit simulating molding in form and appearance, said conductor unit having electrical conductors insulatedly housed therein, an interconnecting unit adapted to serve as means for serially interconnecting pairs of said conductor units, said interconnecting unit including a base portion of insulating material housing electrical conducting elements for mechanical and electrical connection to the conductors of the conductor unit, the end walls of said interconnecting unit being arranged for close surface contact with the end wall of an associated conductor unit, and removable cover means for said interconnecting unit, said cover means extending beyond the end walls thereof and having an underface contour conforming to the face of the associated conductor units, whereby an intimate contact is had and maintained between said cover extensions and the faces of the associated conductor units, said cover plate being provided with apertures affording contact with said electrical conducting elements.

ROBERT L. DAVISON.